UNITED STATES PATENT OFFICE.

CHRISTOPHER WEBB SMITH, OF HIGHFIELD NEAR STROUD, ENGLAND.

IMPROVEMENT IN THE MANUFACTURE OF INDIGO.

Specification forming part of Letters Patent No. 130,666, dated August 20, 1872.

Specification describing certain Improvements in the Extraction of Indigo and other similar Substances from Plants Containing such Substances, invented by CHRISTOPHER WEBB SMITH, of Highfield near Stroud, in the county of Gloucester, England, manufacturing chemist.

Various methods have been adopted for extracting indigo from the ordinary indigo plants, but such methods have usually involved the use of processes of maceration and fermentation, and would not be found practically successful when applied to the wild-indigo plant.

In treating plants containing indigo or other similar dye substances, I adopt the following improved process: I first separate the leaf-coloring substance, (chlorophyl,) and other substances not containing indigo, by boiling or infusing the leaves or other parts of the plants in a solution of carbonated alkali of the strength of about from $\frac{1}{2}°$ to $1°$ Baumé. Instead of the above-mentioned alkali other solvents, that will act in an analogous manner, may be used.

The solution so obtained will not be found to contain indigo, and is, therefore, run off. The residuum left is then subjected to a boiling solution of from $2°$ to $5°$ Baumé of soda, caustic soda, potash, or lime, or other analogous chemical agents. I find it preferable to employ a mixture of lime, and of the proportionate of ten per cent. of the weight of the dry leaf. When the mixture is at the boiling point I add a suitable quantity, varying from one to three per cent., of the weight of the dry plant operated on, of stannous chloride and protoxide of zinc, or either of them, or any other substance that is greedy of or has a powerful affinity for oxygen. The boiling is continued till the whole of the indigo is extracted and dissolved, which may be ascertained by an examination of the treated plant. The solution so obtained is then drawn off into suitable vessels, and thrown down and collected in the usual manner, and dried off for sale or use.

The process above described I employ with very beneficial results for treating and extracting indigo from plants in the dried state. I also find that it may be successfully applied to the spent plants or the residuum thereof, after they have been submitted to the usual process for extracting the indigo contained in them, but which, after such process, will be found to contain a percentage of blue, owing to the imperfect operation of the ordinary process. Such residuum percentage has hitherto been ordinarily wasted, but, by means of my improved process, it may be turned to account.

It will be found that by the employment of my improved process not only will the operation of extracting the indigo be performed more economically and efficiently, and in a shorter time than by the old process, but the product obtained will be of a uniformly superior quality.

In the use of indigo it has been an ordinary practice hitherto to employ woad in the ordinary dye-vat when woolen or other fabrics are dyed. As a substitute for such use of woad, from which comparatively little coloring matter is extracted, I use the indigo plant as imported in a dry state, and I prepare it for use by subjecting it to heat and grinding it into a powder. In that state, or mixed up to form a paste, I employ the pulverized indigo plant as a substitute for the woad, and find that it gives greatly improved results and yields a large percentage of coloring matter.

Having now described my invention, I would have it understood that the details above described may, as will be understood, be somewhat varied; but

What I claim as my invention is—

The employment of the improved process of treating indigo and analogous plants, and extracting indigo and analogous substances, substantially in the manner and for the purpose above described.

I also claim the preparation and use of the dried indigo plants as a substitute for woad, in the manner and for the purpose above described.

CHRISTOPHER WEBB SMITH. [L. S.]

Witnesses:
    WILBERFORCE HEELAS,
        *Solicitor, Stroud.*
    EDWARD C. DAVIS,
        *Clerk to W. Heelas.*